L. L. SIMPSON.
ELECTRIC FURNACE.
APPLICATION FILED JULY 24, 1915.

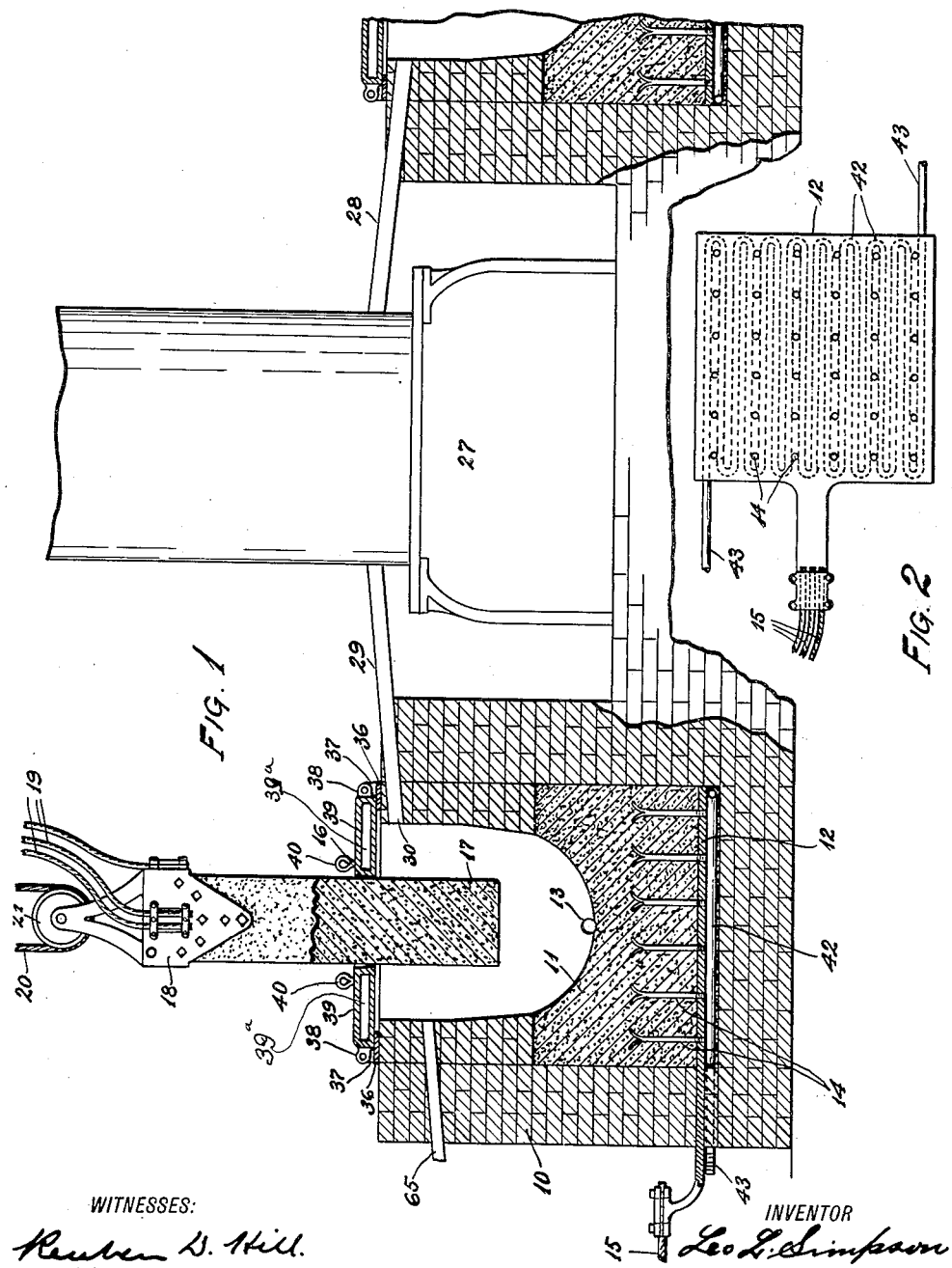

1,288,240.

Patented Dec. 17, 1918.
3 SHEETS—SHEET 2.

WITNESSES:
Reuben D. Hill
L. H. Wheeler

INVENTOR
Les. L. Simpson
BY

ATTORNEY

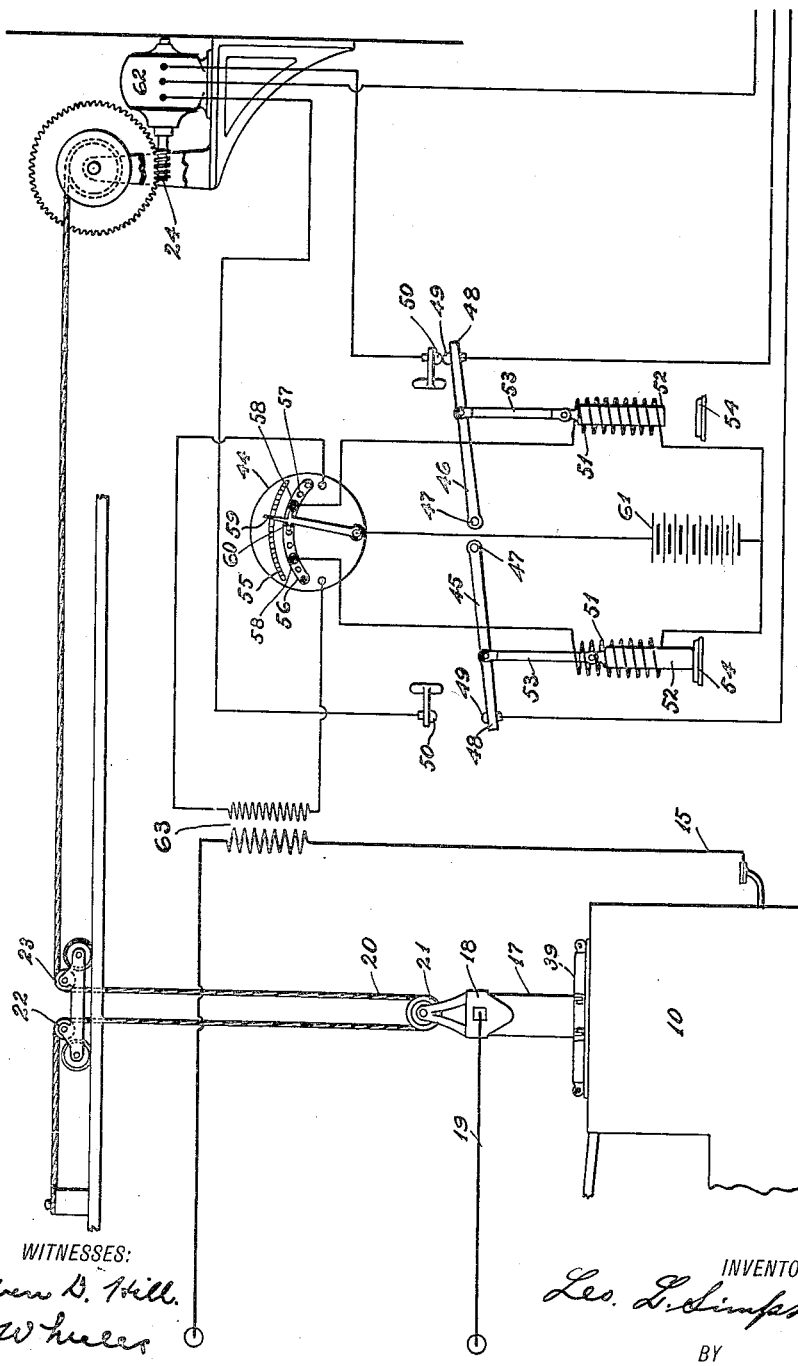

UNITED STATES PATENT OFFICE.

LEO L. SIMPSON, OF SEATTLE, WASHINGTON, ASSIGNOR TO ADRIAN H. SROUFE, OF SEATTLE, WASHINGTON.

ELECTRIC FURNACE.

1,288,240.  Specification of Letters Patent.  Patented Dec. 17, 1918.

Application filed July 24, 1915. Serial No. 41,743.

*To all whom it may concern:*

Be it known that I, LEO L. SIMPSON, citizen of the United States, residing at Seattle, in the county of King and State of Washington, have invented a certain new and useful Improvement in Electric Furnaces, of which the following is a specification.

Such improvements are in, and in parts of, electric furnaces, and consist of cooling means comprising a water jacketed head carbon electrode, water jacketed furnace cover, and water jacketed copper bottom of the carbon electrode.

The principal objects of the inventions and the purposes for which the same are especially adapted, are to provide improvements in the economical operation of such furnaces in the processes of the manufacture of iron, steel and its alloys, and in the reduction of ores, minerals and metals, and while permitting intensely high temperatures in such furnaces maintaining a lower temperature, than otherwise possible, in the metallic head of the carbon shaft electrode, the metallic furnace covers, and the copper plate contact of the carbon crucible electrode, and also prolonging and extending the use and endurance of such metal parts, and by which, together with a regulating device, to greatly reduce the resistance to electric current and consumption of electricity, and also to precipitate the metallic gases into the metal bath, preventing the divergence of electric current to the walls of the furnace, and directing the same into the center of the bath, and to improve the utilization in said processes of a coke of high ash percentage.

By means of my water jacketed covers, the same are kept sufficiently cool to precipitate all metallic gases into the metal bath, and avoid conducting electric current to the side walls of the furnace, thereby also avoiding the rapid burning out of such walls.

Use of an automatic regulating device avoids the necessity of labor of watchman as at present required, and by securing uniformity in amperage greatly reduces the consumption of electric current, and very greatly lengthens the lasting use and life of the carbon electrodes, as well as avoids the frequent burning out of the refractory lining of the furnace.

By means of a combination of cupola with electric furnace, whereby the charge is reduced to melted state in the cupola, and through direct metal tap conducted in such state into the electric furnace, the infusible ash is kept from the electric furnace, thereby preventing the fouling of the same, and the consumption of electricity is greatly reduced; this advantage is of greater importance where coke of high ash percentage is used, and especially on the Pacific coast of America.

Such electric furnace may be used with equal facility, with or without combination with blast furnace cupola.

Figure 1 is a sectional side view of blast furnace cupola and electric furnaces;

Fig. 2 is a top view of water jacketed copper bottom contact plate;

Fig. 7 is a side view of automatic regulating device.

Figure 3:
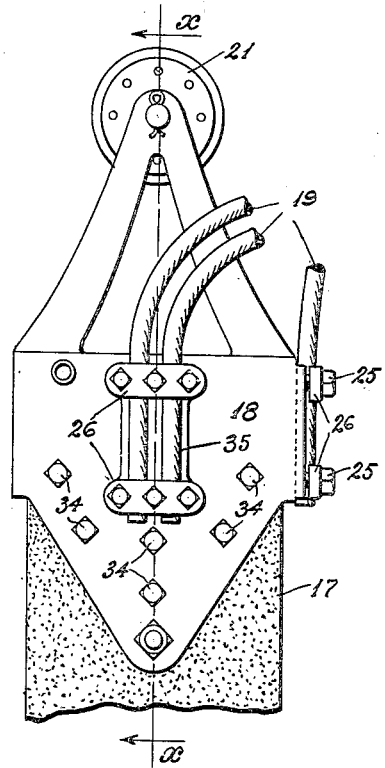
Fig. 3 is an enlarged side view of water jacketed head of upper carbon.
Figure 4:
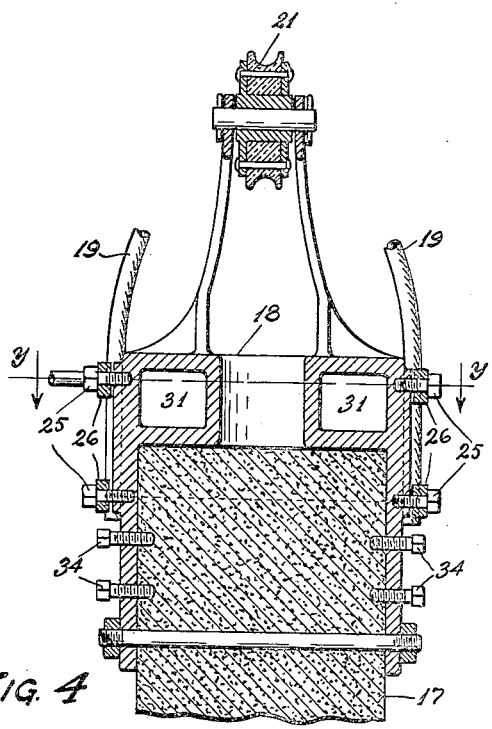
Fig. 4 is a vertical section of water jacketed head of upper carbon, on broken line $xx$ of Fig. 3, showing receptacle for water.
Figure 5:
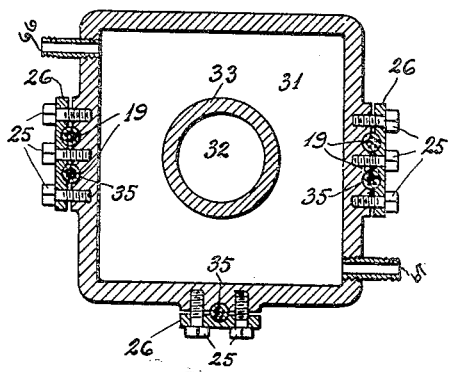
Fig. 5 is a cross section of water jacketed head of upper carbon, at $yy$ of Fig. 4, and showing receptacle for water.
Figure 6:
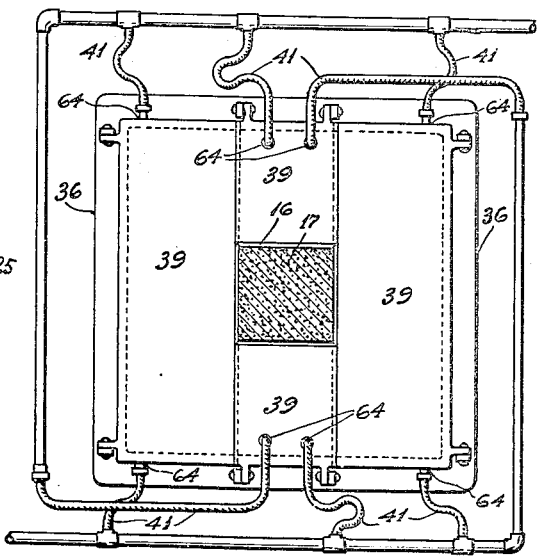
Fig. 6 is a top view of water jacketed furnace covers.

My invention relates to such improved construction of electric furnaces as secures economy in the use of electricity in the reduction of ores to metal and the manufacture of iron, steel and alloys. It comprises improvements in such electric furnaces consisting of a square receptacle 10 constructed of brick or otherwise, lined in the upper portion with refractory brick, and at bottom with carbon paste 11, forming an interior carbon crucible, underneath of which is a heavy copper plate 12. A metal tap 13 is situated at bottom of the crucible, and a slag tap 65 at higher part of it; such carbon crucible 11 constituting a lower electrode in said furnace 10, and being connected with a copper plate 12 on which the same rests. Contact therewith is formed by means of a series of split head copper bolts 14 cast into the plate and clamps, and such copper plate 12 is connected with a common electric transformer by a series of round wire cables 15. Extending down through an aperture 16 in the top of said furnace is an upper and opposite electrode consisting of a carbon shaft 17 having a copper head 18 as herein described and connected by means of round wire electric cables 19 with opposite polarity of such transformer. The top or upper end of such carbon shaft electrode is fastened to the copper head and suspended by a supporting cable 20, from over head, passing over a sheave 22 on a trolley 23 and down around a sheave 21 in the copper electrode head, thence back over another sheave on the trolley 23, thence over to a wall and down to a drum. The electric cables are fastened to such copper head by means of bolts 25 and clamps 26. Such suspended carbon shaft electrode is adjustable in elevation by means of the supporting cable 20 and controlling a device as hereinafter described, so that the same may be raised or lowered to necessary position as to the carbon crucible 11 to produce an electric arc. A common transformer (not shown) is situated near the furnace and converts the electricity to high amperage, and from high to low voltage and each of such cables 15 and 19, connecting the electrodes 11 and 17 with the transformer, is to carry about 1,000 amperes.

My water jacketed carbon electrode head 18, includes a copper casting in one piece, in the top of which is a receptacle 31, for water, embracing space horizontally commensurate with the size of the carbon electrode shaft 17, and has a circular opening 32 in center, surrounded by a wall 33, equal in height with top of receptacle 31. This opening is to facilitate the removal of the carbon shaft 17 from the copper head 18, and the forcing of the same free. The electrode head receives the carbon electrode shaft 17 from below and is attached thereto, and contact therewith formed, by means of copper set bolts 34, threaded through the outer depending wall of the copper head 18, and screwed half ($\frac{1}{2}$) inch or more into carbon electrode 17. Contact of the electric cables with the electrode head is accomplished by means of corrugations 35 cast on the exterior of the head 18, to receive half of the round electric cables, and by clamps 26 to receive other half, fastened with bolts 25 tapped in such head. The head is projected upward above the water jacket portion to carry the insulated sheave 21. The receptacle for water is connected with a water supply and circulation effected through intake 66 and overflow 67 by hose pipe, (not shown).

The water jacketed furnace top and cover is constructed by means of a sole plate rim 36 situated upon the top of the furnace well or crucible, with cast lugs 37 set as hinges 38, and the hinges 38 receive and hold four hollow cast iron doors or covers 39, one on each of the four sides. The doors are slightly beveled at the inner edges and have rings 40 for lifting, and the hollow 39ᵃ in each door is to be filled with water and to be connected at 64, for intake and overflow, by hose pipe 41, with a water supply for circulation.

My water jacketed bottom contact copper plate 12, is situated upon a series of close return, brass pipes 42 (carrying water) and which are immediately underneath and against the plate 12. The pipes 42, are packed with asbestos cement, and connected for intake and overflow by hose or pipes 43, to water supply for circulation.

The automatic regulating device includes an insulated base with an ammeter 44 mounted on its upper half and below it two metal arms 45 and 46 are pivoted at 47, and extend out to the outer side of the insulated base. In the outer end 48, of arms 45, 46, is an insulated receptacle for a carbon plug 49, and immediately above each of such arms, on the outer side of the base, is a metal bracket carrying a copper plug 50, 50; below the center of each arm is a magnet coil 51, 51 attached to the insulated base and having a movable plunger 52, 52 attached by the link 53, 53 to its metal arm 45. Below such plunger 52, is a shelf 54, with a rubber cushion to receive the plunger when in its lower position as shown. On ammeter 44 is a dial recording arc 55, and immediately below it is another arc 56 of fiber or hard rubber perforated with holes 57 at certain distances apart and fitted with removable metal pin 58, 58 to be attached with direct circuit line. There is a needle 59 having a platinum cross pin 60 which is connected with a direct circuit line leading to an electric source 61. As the needle 59 moves and forms contact by a platinum point with a metal pin, the direct current circuit is closed, then the magnet is energized and plunger 51 rises closing circuit between the metal arm 45 and bracket 50, closing the alternating circuit to a reversible motor 62, causing the motor to move the electrode of the furnace when amperage is increased or reduced as case may be. When the contact on the dial of direct circuit is broken the deënergized magnet 52, by gravity, drops the metal arm 45 back to place and breaks contact with motor 62. The current transformer 63 takes its power from induced current generated by the main cables 15 or 19 passing through it but not connected therewith.

I am aware that prior to my invention electric furnaces with carbon shaft and crucible have been constructed, and I do not claim thereon, but having thus described my invention,

I claim:—

1. An electric furnace having, in combination, an adjustable carbon electrode, and a cap or holder for the carbon comprising a head with a socket on its lower side, the head having a transverse cooling chamber immediately above and one wall of which forms the top of the socket, and means for securing the carbon in said socket, the chamber provided with an opening for facilitating ejection of the carbon.

2. In an electric furnace, a carbon holder having a chambered head, a socket below said head for a carbon, the side of the socket having depending flanges, and means passing through the flanges to secure the carbon.

3. In an electric furnace, a cap plate therefor, and a cover structure comprising a pair of parallel side leaves spaced at their inner edges when laid to close the furnace, a pair of other leaves of a width approximately the distance between the closed side leaves, whereby when all the leaves are closed, each coöperates to form an opening for a carbon.

In witness whereof I hereunto subscribe my name this 12th day of July, A. D. 1915.

LEO L. SIMPSON.

Witnesses:
N. S. PETERSON,
REUBEN D. HILL.